US012638893B2

(12) United States Patent
Rangarajan

(10) Patent No.: US 12,638,893 B2
(45) Date of Patent: May 26, 2026

(54) HETEROGENEOUS PROCESSOR-BASED SYSTEM FOR DYNAMICALLY COUPLING POWER AND CLOCK TO A LAST LEVEL CACHE

(71) Applicant: QUALCOMM Incorporated, San Diego, CA (US)

(72) Inventor: Bharat Kumar Rangarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 18/738,175

(22) Filed: Jun. 10, 2024

(65) Prior Publication Data

US 2025/0377701 A1 Dec. 11, 2025

(51) Int. Cl.

| | |
|---|---|
| *G06F 1/26* | (2006.01) |
| *G06F 1/04* | (2006.01) |
| *G06F 1/18* | (2026.01) |
| *G06F 1/3203* | (2019.01) |
| *G06F 1/3234* | (2019.01) |
| *G06F 1/3287* | (2019.01) |
| *G06F 9/4401* | (2018.01) |
| *G06F 12/0897* | (2016.01) |

(52) U.S. Cl.
CPC .................. *G06F 1/26* (2013.01); *G06F 1/04* (2013.01); *G06F 1/189* (2013.01); *G06F 1/263* (2013.01); *G06F 1/3203* (2013.01); *G06F 1/3275* (2013.01); *G06F 1/3287* (2013.01); *G06F 9/4418* (2013.01); *G06F 12/0897* (2013.01)

(58) Field of Classification Search
CPC . G06F 1/26; G06F 1/04; G06F 1/3287; G06F 1/3203; G06F 1/263; G06F 12/0897; G06F 1/3275; G06F 9/4418; G06F 1/189
USPC .................................. 713/300, 323; 711/122
See application file for complete search history.

(56) References Cited

U.S. PATENT DOCUMENTS

| | | | | |
|---|---|---|---|---|
| 2016/0306412 | A1* | 10/2016 | Kolla ..................... | G06F 1/3287 |
| 2017/0060224 | A1* | 3/2017 | Cao ........................ | G06F 1/3275 |
| 2019/0065359 | A1* | 2/2019 | Rangarajan ......... | G06F 11/3656 |
| 2019/0265778 | A1* | 8/2019 | Srinivas .................. | G11C 5/14 |
| 2019/0346908 | A1* | 11/2019 | Srinivas .................. | G06F 1/26 |
| 2021/0191500 | A1* | 6/2021 | Rangarajan ........... | G06F 12/084 |
| 2023/0015240 | A1* | 1/2023 | Mclellan .............. | G06F 1/3209 |

* cited by examiner

*Primary Examiner* — Ji H Bae
(74) *Attorney, Agent, or Firm* — W&T

(57) ABSTRACT

Aspects disclosed in the detailed description include a heterogenous processor-based system for dynamically coupling power and clock to a last level cache. The heterogenous processor-based system includes a processing cluster of big cores and little cores. The big cores are coupled to a big core power rail to power its operations. The little cores are coupled to a little core power rail to power its operations. The plurality of big and little cores share a last level cache to read data from and write data to. The heterogenous processor-based system is configured to determine whether each of the big cores and little cores are active or inactive. In response to determining that all the big cores are inactive and at least one of the plurality of little cores is active, the processor-based system configured to dynamically couple the little core power rail to the last level cache.

20 Claims, 5 Drawing Sheets

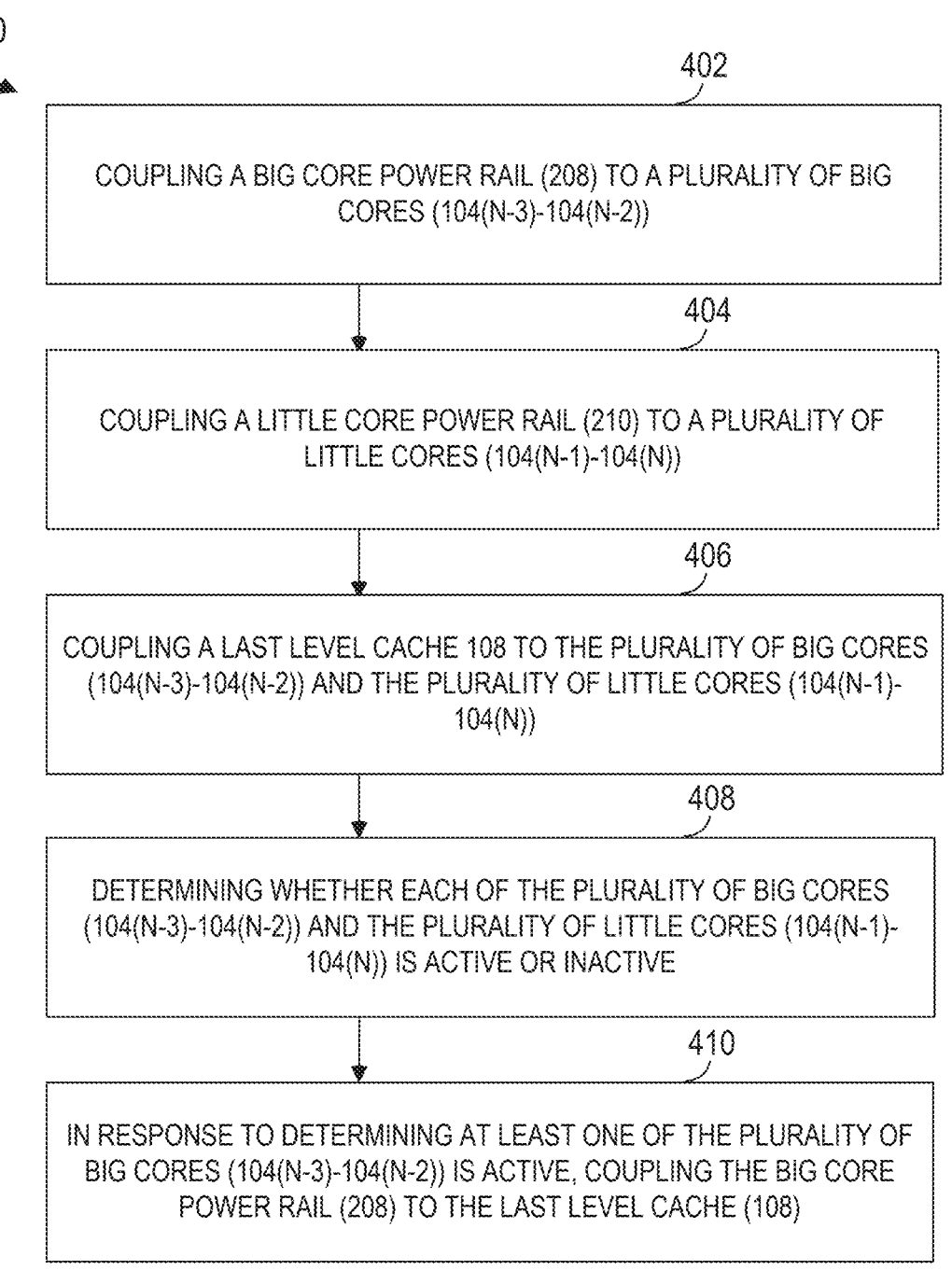

400

402

COUPLING A BIG CORE POWER RAIL (208) TO A PLURALITY OF BIG CORES (104(N-3)-104(N-2))

404

COUPLING A LITTLE CORE POWER RAIL (210) TO A PLURALITY OF LITTLE CORES (104(N-1)-104(N))

406

COUPLING A LAST LEVEL CACHE 108 TO THE PLURALITY OF BIG CORES (104(N-3)-104(N-2)) AND THE PLURALITY OF LITTLE CORES (104(N-1)-104(N))

408

DETERMINING WHETHER EACH OF THE PLURALITY OF BIG CORES (104(N-3)-104(N-2)) AND THE PLURALITY OF LITTLE CORES (104(N-1)-104(N)) IS ACTIVE OR INACTIVE

410

IN RESPONSE TO DETERMINING AT LEAST ONE OF THE PLURALITY OF BIG CORES (104(N-3)-104(N-2)) IS ACTIVE, COUPLING THE BIG CORE POWER RAIL (208) TO THE LAST LEVEL CACHE (108)

FIG. 4

HETEROGENEOUS PROCESSOR-BASED SYSTEM FOR DYNAMICALLY COUPLING POWER AND CLOCK TO A LAST LEVEL CACHE

TECHNICAL FIELD

The field of the disclosure relates to power and clock management in a processor-based system (e.g., a graphics processing unit (GPU)-based system, a central processing unit (CPU)-based system).

BACKGROUND

Microprocessors, also known as s processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system. Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

When data requested by a memory read request is present in a cache memory (i.e., a cache "hit"), system performance may be improved by retrieving the data from the cache instead of slower access system memory. Conversely, if the requested data is not found in the cache (resulting in a cache "miss"), the requested data then must be read from a higher-level cache memory, and if a miss occurs in the higher-level cache memory, the requested data then must be read from a system memory. Frequent occurrences of cache misses result in system performance degradation that could negate the advantage of using the cache in the first place. The last higher-level cache memory before requesting data from the system memory is referred to as a last level cache memory. The last level cache memory is typically powered by a power management integrated circuit (IC) (PMIC) and is clocked by a clock generator.

SUMMARY OF THE DISCLOSURE

Aspects disclosed in the detailed description include a heterogeneous processor-based system for dynamically coupling power and a clock to a last level cache. Related apparatus and methods are also disclosed. The heterogeneous processor-based system includes a processing cluster of one or more big processing cores ("big core(s)") and a processing cluster of one or more little processing cores ("little core(s)"). A big core is designed for high performance to address high performance applications including, but not limited to, gaming applications, video streaming, and camera streaming, and contains features like out-of-order execution and longer pipelines than a corresponding little core. Big cores can deliver higher performance at the cost of higher power consumption. A little core is designed for power efficiency to address low power consumption applications including, but not limited to, mobile communications, and contains simpler pipelines that are shorter than big cores and may be capable of either in-order pipelines or out-of-order pipelines.

In this regard, the heterogeneous processor-based system includes big cores and little cores. The big cores are coupled to a big core power rail to power its operations. The little cores are coupled to a little core power rail to power its operations. The plurality of big and little cores share a last level cache to read data from and write data to. The heterogeneous processor-based system is configured to determine whether each of the big cores and little cores is active or inactive. In response to determining at least one of the big cores is active, the processor-based system is configured to dynamically couple the big core power rail to the last level cache. In response to determining that all the big cores are inactive and at least one of the plurality of little cores is active, the processor-based system configured to dynamically couple the little core power rail to the last level cache. In so doing, the heterogeneous processor-based system described herein advantageously achieves the high performance requirements of big cores by powering and clocking the last level cache with the same power and clock source driving the big cores and the low power consumption requirements of little cores, when all big cores are inactive, by powering and clocking the last level cache with same power and clock source driving the little cores without paying a penalty of mismatch circuitry (e.g., asynchronous circuits and voltage level shifters) deployed between the big cores and the last level cache.

In one aspect, a processor-based system is provided. The processor-based system includes a processor cluster. The processor cluster includes a plurality of big cores and a plurality of little cores. The processor-based system also includes a power management circuit. The power management circuit includes a big core power rail coupled to the plurality of big cores and a little core power rail coupled to the plurality of little cores. The processor-based system also includes a last level cache configured to store data and coupled to the plurality of big cores and the plurality of little cores. The processor-based system is configured to determine whether each of the plurality of big cores and the plurality of little cores is active or inactive. In response to determining at least one of the plurality of big cores is active, the processor-based system is configured to couple the big core power rail to the last level cache.

In another aspect, a method for dynamically coupling power and a clock to a last level cache is provided. The method includes coupling a big core power rail to a plurality of big cores. The method also includes coupling a little core power rail to a plurality of little cores. The method also includes coupling the last level cache to the plurality of big cores and the plurality of little cores. The method also includes determining whether each of the plurality of big cores and the plurality of little cores is active or inactive. In response to determining at least one of the plurality of big cores is active, the method also includes coupling the big core power rail to the last level cache.

In another aspect, a processor-based system for dynamically coupling power and a clock to a last level cache is provided. The processor-based system includes means for coupling a big core power rail to a plurality of big cores. The processor-based system also includes means for coupling a little core power rail to a plurality of little cores. The processor-based system also includes means for coupling the last level cache to the plurality of big cores and the plurality of little cores.

BRIEF DESCRIPTION OF THE FIGURES

FIG. 3A shows an exemplary state where at least one big core in the heterogeneous cluster is active, wherein the processor-based system in FIG. 2 dynamically couples the power and clock to the last level cache to match the power and clock of the big core;

FIG. 3B shows an exemplary state where all the big cores in the heterogeneous cluster are inactive and at least one of the little cores are active, wherein the processor-based system in FIG. 2 dynamically couples the power and clock to the last level cache to match the power and clock of the little core;

FIG. 4 is a flowchart illustrating an exemplary process for dynamically coupling the power and clock to the last level cache to match the power and clock of either the big or little cores based on their activity states in a processor-based system including the processor-based system in FIGS. 1-3.

DETAILED DESCRIPTION

Figure 1:
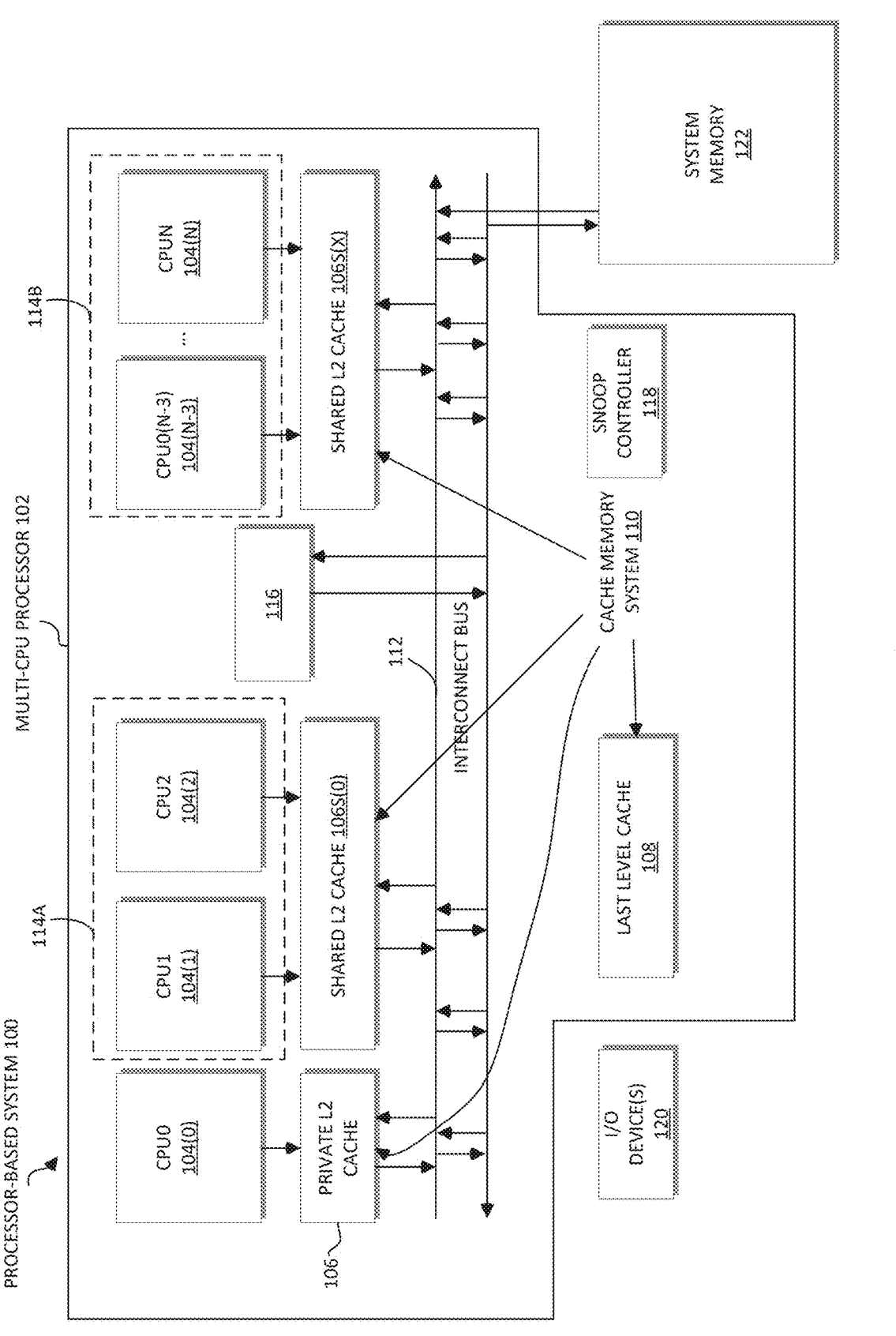
FIG. 1 is a block diagram of an exemplary processor-based system that includes heterogeneous clusters of big and little cores and a memory system that includes a cache memory system including a hierarchy of local and shared cache memories including a last level cache and a system memory, and wherein the processor-based system is configured to dynamically couple the power and clock to the last level cache to match the power and clock of either the big or little cores based on their activity states.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a heterogeneous processor-based system for dynamically coupling power and a clock to a last level cache. Related apparatus and methods are also disclosed. The heterogeneous processor-based system includes a processing cluster of one or more big processing cores ("big core(s)") and a processing cluster of one or more little processing cores ("little core(s)"). A big core is designed for high performance to address high performance applications including, but not limited to, gaming applications, video streaming, and camera streaming, and contains features like out-of-order execution and longer pipelines than a corresponding little core. Examples of big core may be an ARM® Cortex-A15 and a Cortex-A57 core. Big cores can deliver higher performance at the cost of higher power consumption. A little core is designed for power efficiency to address low power consumption applications including, but not limited to, mobile communications, and contains simpler pipelines that are shorter than big cores and may be capable of either in-order pipelines or out-of-order pipelines.

In this regard, the heterogeneous processor-based system includes big cores and little cores. The big cores are coupled to a big core power rail to power its operations. The little cores are coupled to a little core power rail to power its operations. The plurality of big and little cores share a last level cache to read data from and write data to. The heterogeneous processor-based system is configured to determine whether each of the big cores and little cores is active or inactive. In response to determining at least one of the big cores is active, the processor-based system is configured to dynamically couple the big core power rail to the last level cache. In response to determining that all the big cores are inactive and at least one of the plurality of little cores is active, the processor-based system configured to dynamically couple the little core power rail to the last level cache. In so doing, the heterogeneous processor-based system described herein advantageously achieves the high performance requirements of big cores by powering and clocking the last level cache with the same power and clock source driving the big cores and the low power consumption requirements of little cores, when all big cores are inactive, by powering and clocking the last level cache with same power and clock source driving the little cores without paying a penalty of mismatch circuitry (e.g., asynchronous circuits and voltage level shifters) deployed between the big cores and the last level cache.

In this regard, FIG. 1 is a block diagram of an exemplary processor-based system 100 that includes heterogeneous clusters of big and little cores and a memory system that includes a cache memory system including a hierarchy of local and shared cache memories including a last level cache and a system memory, and wherein the processor-based system is configured to dynamically couple the power and clock to the last level cache to match the power and clock of either the big or little cores based on their activity states. Before discussing these aspects, other exemplary aspects of the processor-based system 100 are first described below.

The processor-based system 100 includes a multiple (multi-) central processing unit (CPU) (multi-CPU) processor 102 that includes multiple CPUs 104(0)-104(N) and a hierarchical memory system. As part of the hierarchical memory system, for example, CPU 104(0) includes a private local cache memory 106, which may be a Level 2 (L2) cache memory. CPUs 104(1), 104(2) and CPUs 104(N−1), CPU 104(N) are configured to interface with respective local shared cache memories 106S(0)-106S(X), which may also be L2 cache memories for example. If a data read request requested by a CPU 104(0)-104(N) results in a cache miss to the respective cache memories 106, 106S(0)-106S(X), the read request may be communicated to a next-level cache memory, which in this example is a shared system cache memory 108, also referred to as a last level cache 108. For example, the last level cache 108 may be a Level 3 (L3) cache memory. The cache memory 106, the local shared cache memories 106S(0)-106S(X), and the shared system cache memory 108 are part of a hierarchical cache memory system 110. An interconnect bus 112, which may be a coherent bus, is provided that allows each of the CPUs 104(0)-104(N) to access the shared cache memories 106S (0)-106S(X) (if shared to the CPU 104(0)-104(N)), the shared system cache memory 108, and other shared resources coupled to the interconnect bus 112.

CPU 104(1) is a big core and CPU 104(2) is a little core. Heterogeneous processor cluster 114A comprises the CPU 104(1) and CPU 104(2). The heterogeneous processor cluster 114B comprises CPUs 104(N-3)-104(N) where CPUs 104(N-3)-104(N-2) are big cores and CPUs 104(N-1)-104 (N) are little cores. For example, the big cores 104(N-3)-104(N-2) are powered by being coupled to a big core power rail (not shown) and clocked by a big core clock (not shown). The little cores 104(N-1)-104(N) are powered by being coupled to a little core power rail (not shown) and clocked by a little core clock (not shown).

The processor-based system 100 in FIG. 1 includes a control circuit 116. The control circuit 116 communicates with the CPUs 104(0)-104(N) over the interconnect bus 112 in the multi-CPU processor 102. The control circuit 116 is configured to determine whether each of the big cores in the processor clusters 114A-114B and the plurality of little cores in processor clusters 114A-114B are active or inactive. A big core or little core is active when it processes instructions to accomplish a workload and inactive when it does not. In response to determining at least one of the big cores 104 (N-3)-104(N-2) is active, the control circuit 116 couples the big core power rail to the last level cache 108 and, optionally, couples the big core clock to the last level cache 108. The last level cache 108 will handle memory requests originating from both the big cores 104(N-3)-104(N-2) and little cores 104(N-1)-104(N) while being powered by the same power rail as the big cores 104(N-3)-104(N-2) and being optionally clocked by the same clock as the big core clock. Conversion circuitry, which will be discussed in connection with FIG. 2, will not be needed by the big cores 104(N-3)-104(N-2) and will be used by the little cores 104(N-1)-104(N) to handle the mismatch in power and clock between the little cores 104(N-1)-104(N) and the last level cache 108. In response to determining that the big cores 104(N-3)-104(N-2) are inactive and at least one of the little cores 104(N-1)-104(N) is active, the control circuit 116 couples the little core power rail to the last level cache 108 and, optionally, couples the little core clock to the last level cache 108. The last level cache 108 will handle memory requests originating from the little cores 104(N-1)-104(N) (there will not be any from the big cores since they are inactive) while being powered by the same power rail as the little cores 104(N-1)-104(N). In so doing, conversion circuitry will not be operative by the little cores 104(N-1)-104(N). Advantageously, conversion circuitry will only be deployed with little cores saving resources and chip area.

With continuing reference to FIG. 1, the processor-based system 100 in this example also includes a snoop controller 118, which is also coupled to the interconnect bus 112. The snoop controller 118 is a circuit that monitors or snoops cache memory bus transactions on the interconnect bus 112 to maintain cache coherency among the cache memories 106, 106S(0)-106S(X), 108 in the cache memory system 110. Other shared resources that can be accessed by the CPUs 104(0)-104(N) through the interconnect bus 112 can include input/output (I/O) devices 120 and a system memory 122 (e.g., a dynamic random access memory (DRAM)). If a cache miss occurs for a read request issued by a CPU 104(0)-104(N) in each level of the cache memories 106, 106S(0)-106S(X), 108 accessible for the CPU 104(0)-104 (N), the read request is serviced by the system memory 122, and the data associated with the read request is installed in the cache memories 106, 106S(0)-106S(X), 108 associated with the requesting CPU 104(0)-104(N).

Figure 2:
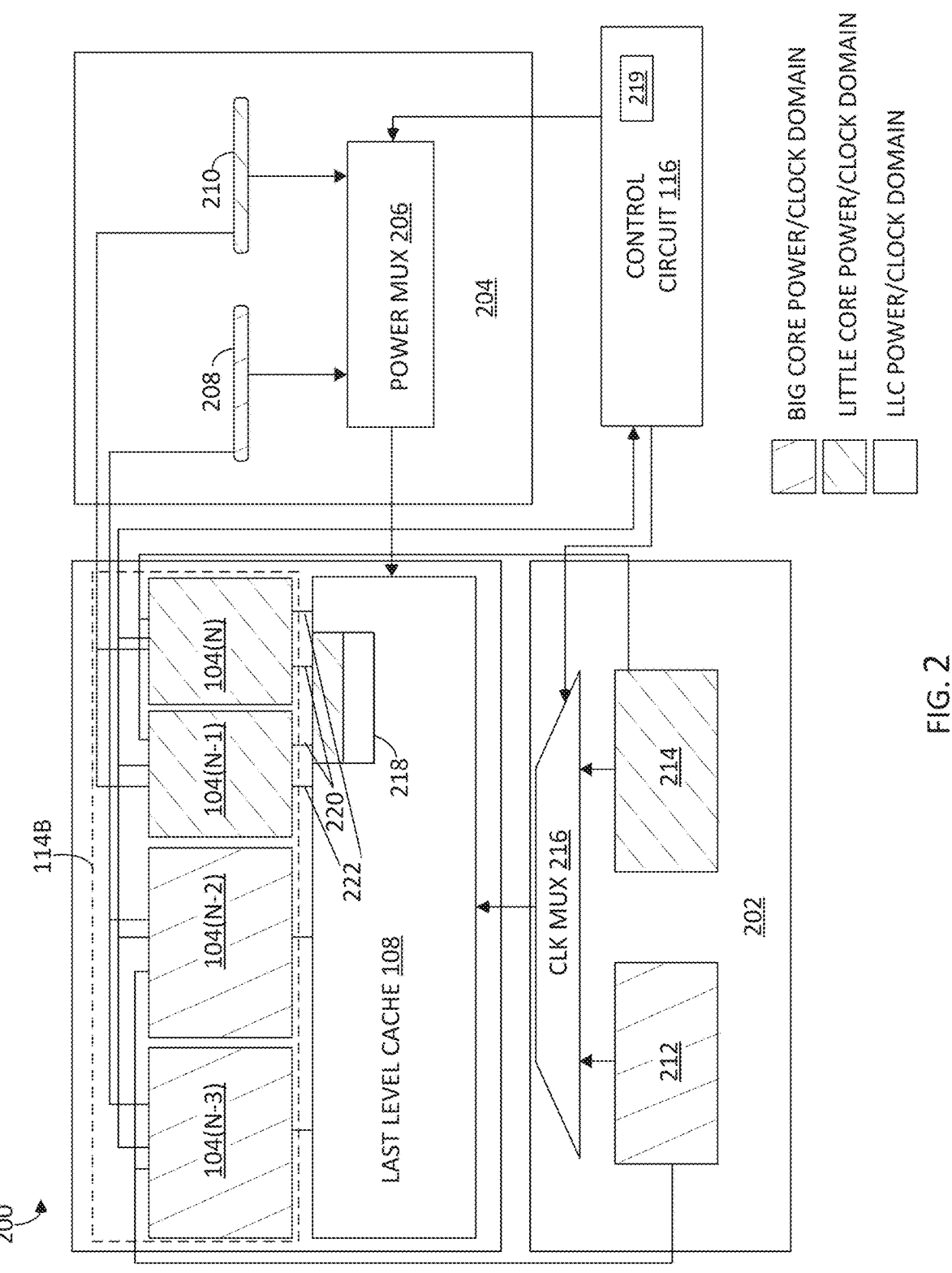
FIG. 2 is a close-up view of a portion of the exemplary processor-based system in FIG. 1 including an exemplary heterogeneous cluster, a clock management circuit, and a power management circuit, wherein the processor-based system is configured to dynamically couple the power and clock to the last level cache to match the power and clock of either the big or little cores based on their activity states.

FIG. 2 is a close-up view of a portion 200 of the exemplary processor-based system 100 in FIG. 1 including an exemplary heterogeneous cluster, such as the processor cluster 114B, a clock management circuit 202, and a power management circuit 204, wherein the processor-based system 100 is configured to dynamically couple the power and clock to the last level cache 108 to match the power and clock of either the big or little cores based on their activity states. The power management circuit 204 includes a power multiplexer 206 which switches between powering the last level cache 108 with a big core power rail 208 (e.g., big power source) and powering the last level cache 108 with a little core power rail 210 (e.g., little power source). The big core power rail 208 powers the big cores 104(N-3)-104(N). The little core power rail 210 powers the little cores 104 (N-1)-104(N). The shading in FIG. 2 indicates the power and clock domains of the big cores 104(N-3)-104(N-2) and little cores 104(N-1)-104(N). The clock management circuit 202 includes a big core clock 212 which clocks the big cores 104(N-3)-104(N-2) and a little core clock 214 which clocks the little cores 104(N-1)-104(N). The clock management circuit 202 also includes a clock multiplexer 216 which switches between clocking the last level cache 108 with the big core clock 212 and clocking the last level cache 108 with the little core clock 214. The last level cache 108 includes a conversion circuit 218 which converts the data communicated between the little cores 104(N-1)-104(N) and the last level cache 108 from the little core power and clock domain to the last level cache 108 power and clock domain and vice versa. In particular, the conversion circuit 218 is configured to shift a base voltage on data lines 220 from the little core power rail 210 to the big core power rail 208 and, optionally, shift a base frequency on the data lines 220 from the little core clock 214 to the big core clock 212. The little cores 104(N-1)-104(N) communicate to the last level cache 108 over data lines 222 when both the little cores 104(N-1)-104 (N) and the last level cache 108 are coupled to the same power rail, power rail 210, and are coupled to the same clock, clock 214. The conversion circuit 218 is utilized when at least one of the big cores 104(N-3)-104(N-2) is active. When all the big cores 104(N-3)-104(N-2) are inactive, the last level cache 108 power and clock domain will be the same as the little core power and clock domain so that the conversion circuit 218 will not be utilized. The conversion circuit 218 includes an asynchronous conversion circuit coupled to a first-in, first-out (FIFO) buffer circuit to convert between different clock domains. The conversion circuit 218 also includes a voltage level shifter circuit to convert between different power domains.

Figure 3A:
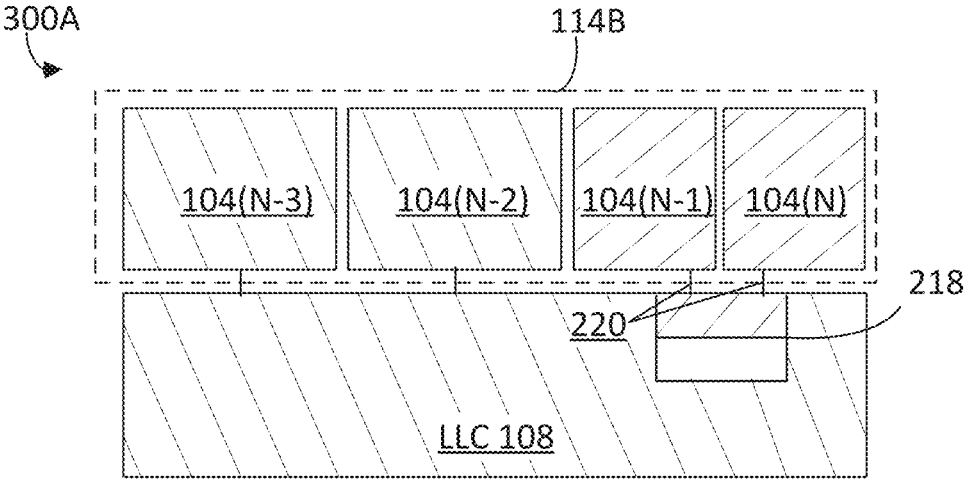
FIGS. 3A-3B show two exemplary states of the heterogeneous cluster wherein the processor-based system in FIG. 2 is configured to dynamically couple the power and clock to the last level cache to match the power and clock of either the big or little cores based on their activity states.

In operation, the control circuit 116 determines whether each of the big cores 104(N-3)-104(N-2) and the little cores 104(N-1)-104(N) is active or inactive. One means of doing so includes monitoring whether instructions are being processed or not by the big cores 104(N-3)-104(N-2) and the little cores 104(N-1)-104(N). If the control circuit 116 receives a signal from a corresponding core that it is not processing instructions, the corresponding core is inactive. If the control circuit 116 receives a signal from a corresponding core that it is processing instructions, the corresponding core is active. Another means of doing so includes monitoring whether either the power rails 208, 210 have been gated off (e.g., decoupled) from the respective cores or monitoring whether either of the clocks 212, 214 have been gated off from the respective cores. If a power rail or a clock is gated off from a core, the core will be deemed inactive. If a power rail or a clock is gated on to a core, the core will be deemed active. The control circuit 116 may contain a tracking register 219 to track which cores are active and which cores are inactive. For example, each bit may be mapped to a particular core. If the value of the bit is 0, the corresponding core is inactive. If the value of the bit is 1, the corresponding core is active. If at least one bit for the big cores, such as the big cores 104(N–3)-104(N–2), is 1, then the control circuit 116 signals the power multiplexer 206 to couple the big core power rail 208 to the last level cache 108 to power the last level cache 108 to operate in the same power domain as the big cores 104(N–3)-104(N–2) and optionally signals the clock multiplexer 216 to couple the big core clock 212 to the last level cache 108 to clock the last level cache 108 to operate in the same clock domain as the big cores 104(N–3)-104(N–2). FIG. 3A shows an exemplary state 300A where at least one big core in the heterogeneous cluster 114B is active, wherein the processor-based system 100 in FIG. 2 dynamically coupled the power and clock to the last level cache 108 to match the power and clock of the big core. During state 300A, memory requests and responses between the little cores 104(N–1)-104(N) and the last level cache 108 pass through the conversion circuit 218 while memory requests and responses between the big cores 104(N–3)-104(N–2) and the last level cache 108 do not pass through the conversion circuit 218. In particular, the conversion circuit 218 is configured to shift a base voltage on the data lines 220 from the little core power rail 210 to the big core power rail 208 and, optionally, shift a base frequency on the data lines 220 from the little core clock 214 to the big core clock 212. Data lines 222 are used for memory requests and responses to pass when the little cores 104(N–1)-104(N) and the last level cache 108 operate on the same power and clock domain.

Figure 3B:
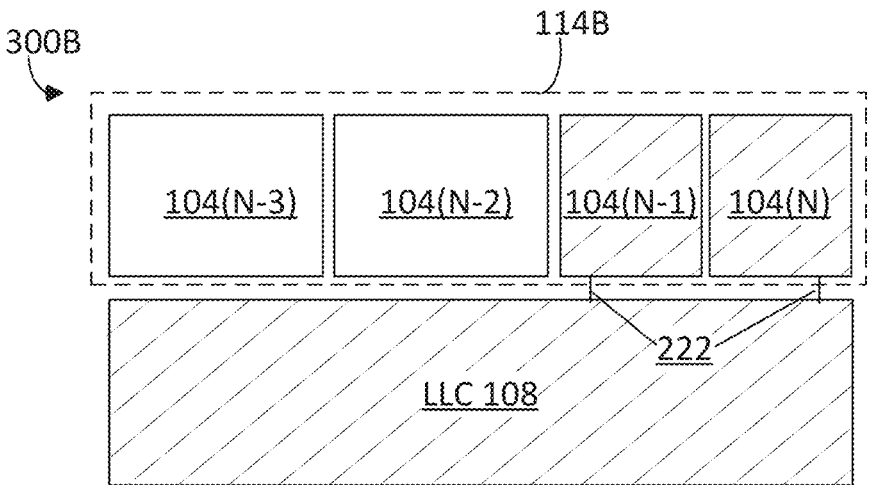

If all the bits for the big cores, such as the big cores 104(N–3)-104(N–2), is 0, and at least one of the bits for the little cores, such as the little cores 104(N–1)-104(N), is 1, then the control circuit 116 signals the power multiplexer 206 to couple the little core power rail 210 to the last level cache 108 to power the last level cache 108 to operate in the same power domain as the little cores 104(N–1)-104(N) and optionally signals the clock multiplexer 216 to couple the little core clock 214 to the last level cache 108 to clock the last level cache 108 to operate in the same clock domain as the little cores 104(N–1)-104(N). FIG. 3B shows an exemplary state 300B where all the big cores 104(N–3)-104(N–2) in the heterogeneous cluster 114B are inactive and at least one of the little cores 104(N–1)-104(N) is active, wherein the processor-based system 100 in FIG. 2 dynamically coupled the power and clock to the last level cache 108 to match the power and clock of the little core. During state 300B, memory requests and responses pass directly between the little cores 104(N–1)-104(N) and the last level cache 108 without passing through the conversion circuit 218. In particular, the memory requests and responses pass over the data lines 222 without passing through the conversion circuit 218.

FIG. 4 is a flowchart illustrating an exemplary process 400 for dynamically coupling the power and clock to the last level cache to match the power and clock of either the big or little cores based on their activity states in a processor-based system including the processor-based system in FIGS.

1-3B. In this regard, a first exemplary step in the process 400 of FIG. 4 may include coupling a big core power rail 208 to a plurality of big cores 104(N–3)-104(N–2) (block 402, FIG. 4). A next step in the process 400 may include coupling a little core power rail 210 to a plurality of little cores 104(N–1)-104(N) (block 404, FIG. 4). A next step in the process 400 may include coupling a last level cache 108 to the plurality of big cores 104(N–3)-104(N–2) and the plurality of little cores 104(N–1)-104(N) (block 406, FIG. 4). A next step in the process 400 may include determining whether each of the plurality of big cores 104(N–3)-104(N–2) and the plurality of little cores 104(N–1)-104(N) is active or inactive (block 408, FIG. 4). A next step in the process 400 may include, in response to determining at least one of the plurality of big cores 104(N–3)-104(N–2) is active, coupling the big core power rail 208 to the last level cache 108 (block 410, FIG. 4).

Electronic devices that include a processor-based system that includes heterogeneous clusters of big and little cores and a memory system that includes a cache memory system including a hierarchy of local and shared cache memories including a last level cache and a system memory, and wherein the processor-based system is configured to dynamically couple the power and clock to the last level cache to match the power and clock of either the big or little cores based on their activity states as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 5:
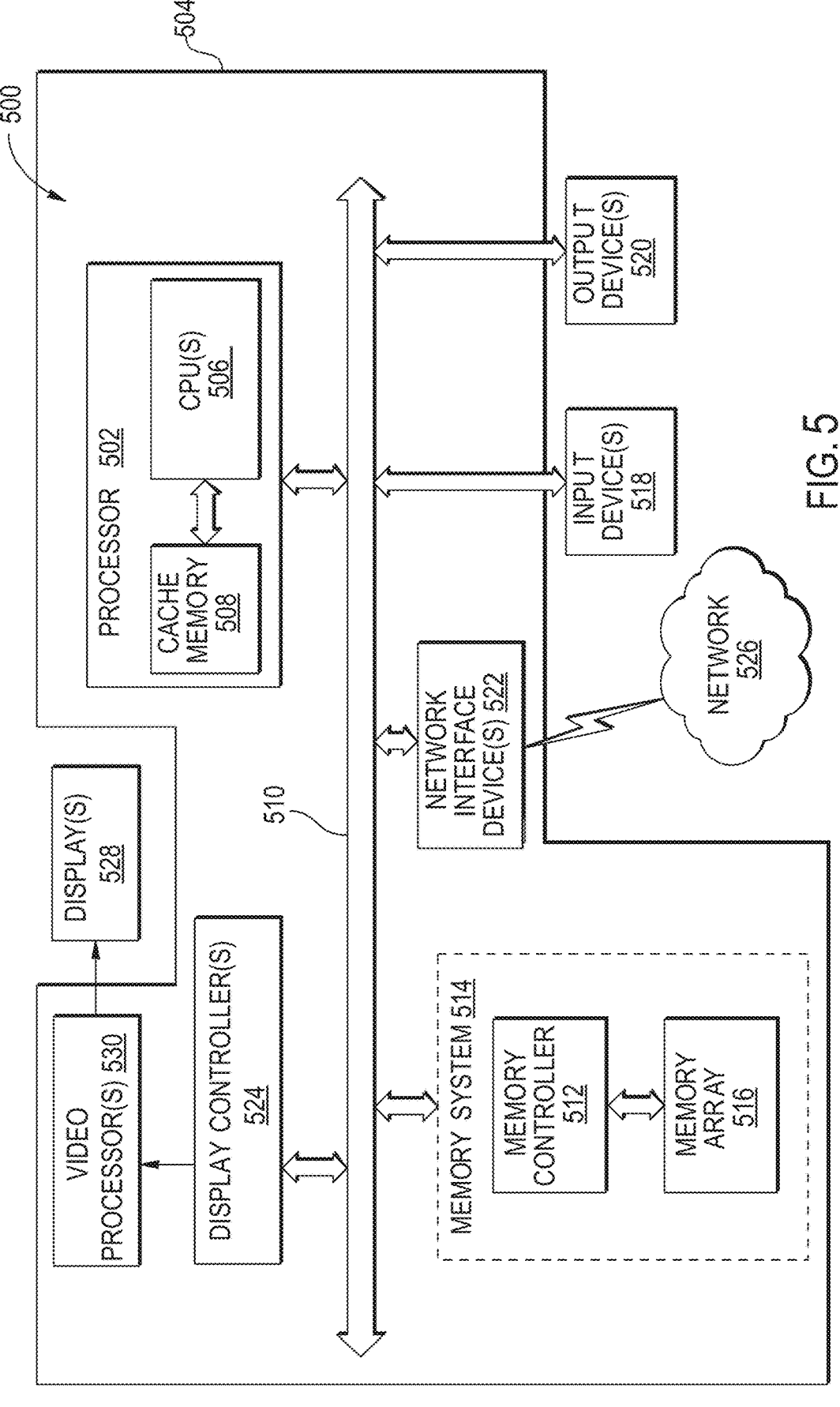
FIG. 5 is a block diagram of an exemplary processor-based system that can include the processor-based system of FIGS. 1-3 which is configured to dynamically couple the power and clock to the last level cache to match the power and clock of either the big or little cores based on their activity states.

In this regard, FIG. 5 is a block diagram of an exemplary processor-based system 500 including, but not limited to, the processor-based system of FIG. 1 and according to exemplary process of FIG. 4 which is configured to dynamically couple the power and clock to the last level cache to match the power and clock of either the big or little cores based on their activity states.

In this example, the processor-based system 500 includes a processor 502 deployed on a semiconductor die 504 wherein the processor-based system 500 is configured to dynamically couple the power and clock to the last level cache to match the power and clock of either the big or little cores based on their activity states as disclosed herein and includes one or more central processing units (captioned as "CPUs" in FIG. 9) 506, which may also be referred to as CPU cores or processor cores. The processor 502 may have cache memory 508 coupled to the processor 502 for rapid access to temporarily stored data. The processor 502 is coupled to a system bus 510 and can intercouple server and client devices included in the processor-based system 500. As is well known, the processor 502 communicates with these other devices by exchanging address, control, and data information over the system bus 510. For example, the processor 502 can communicate bus transaction requests to a memory controller 512, as an example of a client device. Although not illustrated in FIG. 5, multiple system buses 510 could be provided, wherein each system bus 510 constitutes a different fabric.

Other server and client devices can be connected to the system bus 510 and deployed in a semiconductor die 504 wherein the processor-based system 500 is configured to dynamically couple the power and clock to the last level cache to match the power and clock of either the big or little cores based on their activity states as disclosed herein and includes one or more central processing units. As illustrated in FIG. 5, these devices can include a memory system 514 that includes the memory controller 512 and a memory array(s) 516, one or more input devices 518, one or more output devices 520, one or more network interface devices 522, and one or more display controllers 524, as examples. The input device(s) 518 can include any type of input device, including but not limited to input keys, switches, voice processors, etc. The output device(s) 520 can include any type of output device, including, but not limited to, audio, video, other visual indicators, etc. The network interface device(s) 522 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 522 can be configured to support any type of communications protocol desired.

The processor 502 may also be configured to access the display controller(s) 524 over the system bus 510 to control information sent to one or more displays 528. The display controller(s) 524 sends information to the display(s) 528 to be displayed via one or more video processors 530, which process the information to be displayed into a format suitable for the display(s) 528. The display controller(s) 524 and/or the video processors 530 may comprise or be integrated into a GPU. The display(s) 528 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based system, comprising:
   a processor cluster, comprising:
      a plurality of big cores; and
      a plurality of little cores;
   a power management circuit, comprising:
      a big core power rail coupled to the plurality of big cores; and
      a little core power rail coupled to the plurality of little cores; and
   a last level cache configured to store data and coupled to the plurality of big cores and the plurality of little cores;

the processor-based system configured to:

determine whether each of the plurality of big cores and the plurality of little cores is active or inactive; and in response to determining at least one of the plurality of big cores is active:

couple the big core power rail to the last level cache.

2. The processor-based system of clause 1, wherein:

in response to determining the plurality of big cores are inactive and at least one of the plurality of little cores is active, the processor-based system is configured to:

couple the little core power rail to the last level cache.

3. The processor-based system of clause 1 or 2, further comprising:

a clock management circuit, comprising:

a big core clock coupled to the plurality of big cores; and a little core clock coupled to the plurality of little cores;

wherein, in response to determining at least one of the plurality of big cores is active, the processor-based system further is configured to:

couple the big core clock to the last level cache.

4. The processor-based system of clause 3, wherein:

in response to determining the plurality of big cores are inactive and at least one of the plurality of little cores is active, the processor-based system is further configured to:

couple the little core clock to the last level cache.

5. The processor-based system of clause 3 or 4, wherein:

the plurality of little cores are configured to:

communicate with the last level cache through a plurality of data lines; and the processor-based system further comprises:

a conversion circuit coupled to the plurality of little cores and configured to:

shift a base voltage on the plurality of data lines from the little core power rail to the big core power rail.

6. The processor-based system of clause 5, wherein:

the conversion circuit is further configured to:

shift a base frequency on the plurality of data lines from the little core clock to the big core clock.

7. The processor-based system of any of clauses 1-6, wherein:

the processor-based system configured to determine whether each of the plurality of big cores and the plurality of little cores is active or inactive, is further configured to:

monitor whether the big core power rail becomes decoupled from one or more of the plurality of big cores.

8. The processor-based system of any of clauses 3-7, wherein:

the processor-based system configured to determine whether each of the plurality of big cores and the plurality of little cores is active or inactive, is further configured to:

monitor whether the big core clock becomes decoupled from one or more of the plurality of big cores.

9. The processor-based system of any of clauses 1-8 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

10. A method for dynamically coupling power and a clock to a last level cache, comprising:

coupling a big core power rail to a plurality of big cores;

coupling a little core power rail to a plurality of little cores;

coupling the last level cache to the plurality of big cores and the plurality of little cores;

determining whether each of the plurality of big cores and the plurality of little cores is active or inactive; and in response to determining at least one of the plurality of big cores is active: coupling the big core power rail to the last level cache.

11. The method of clause 10, further comprising:

in response to determining the plurality of big cores are inactive and at least one of the plurality of little cores is active:

coupling the little core power rail to the last level cache.

12. The method of clause 10 or 11, further comprising:

coupling a big core clock to the plurality of big cores;

coupling a little core clock to the plurality of little cores; and in response to determining at least one of the plurality of big cores is active: coupling the big core clock to the last level cache.

13. The method of clause 12, further comprising:

in response to determining the plurality of big cores are inactive and at least one of the plurality of little cores is active:

coupling the little core clock to the last level cache.

14. The method of clause 12 or 13, further comprising:

communicating between the plurality of little cores to the last level cache through a plurality of data lines; and coupling a conversion circuit to the plurality of little cores to shift a base voltage on the plurality of data lines from the little core power rail to the big core power rail.

15. The method of clause 14, further comprising:

shifting a base frequency on the plurality of data lines from the little core clock to the big core clock.

16. The method of any of clauses 10-15, wherein:

determining whether each of the plurality of big cores and the plurality of little cores is active or inactive further comprises:

monitoring whether the big core power rail becomes decoupled from one or more of the plurality of big cores.

17. The method of any of clauses 12-16, wherein:

determining whether each of the plurality of big cores and the plurality of little cores is active or inactive further comprises:

monitoring whether the big core clock becomes decoupled from one or more of the plurality of big cores.

18. A processor-based system for dynamically coupling power and a clock to a last level cache, comprising:
   means for coupling a big core power rail to a plurality of big cores;
   means for coupling a little core power rail to a plurality of little cores;
   means for coupling the last level cache to the plurality of big cores and the plurality of little cores;
   means for determining whether each of the plurality of big cores and the plurality of little cores is active or inactive; and
   in response to determining at least one of the plurality of big cores is active: means for coupling the big core power rail to the last level cache.

19. The processor-based system of clause 18, further comprising:
   in response to determining the plurality of big cores are inactive and at least one of the plurality of little cores is active:
      means for coupling the little core power rail to the last level cache.

20. The processor-based system of clause 18 or 19, further comprising:
   means for coupling a big core clock to the plurality of big cores;
   means for coupling a little core clock to the plurality of little cores; and
   in response to determining at least one of the plurality of big cores is active: means for coupling the big core clock to the last level cache.

What is claimed is:

1. A processor-based system, comprising:
   a processor cluster, comprising:
      a plurality of big cores, each big core having a first pipeline length; and
      a plurality of little cores, each little core having a second pipeline length less than the first pipeline length;
   a power management circuit, comprising:
      a big core power rail coupled to the plurality of big cores; and
      a little core power rail coupled to the plurality of little cores; and
   a last level cache configured to store data and coupled to the plurality of big cores and the plurality of little cores;
   the processor-based system configured to:
      determine whether each of the plurality of big cores and the plurality of little cores is active or inactive; and
      in response to determining at least one of the plurality of big cores is active:
         couple the big core power rail to the last level cache.

2. The processor-based system of claim 1, wherein:
   in response to determining the plurality of big cores are inactive and at least one of the plurality of little cores is active, the processor-based system is configured to:
      couple the little core power rail to the last level cache.

3. The processor-based system of claim 1, further comprising:
   a clock management circuit, comprising:
      a big core clock coupled to the plurality of big cores; and
      a little core clock coupled to the plurality of little cores;
   wherein, in response to determining the at least one of the plurality of big cores is active, the processor-based system is further configured to:
      couple the big core clock to the last level cache.

4. The processor-based system of claim 3, wherein:
   in response to determining the plurality of big cores are inactive and at least one of the plurality of little cores is active, the processor-based system is further configured to:
      couple the little core clock to the last level cache.

5. The processor-based system of claim 3, wherein:
   the plurality of little cores are configured to:
      communicate with the last level cache through a plurality of data lines; and
   the processor-based system further comprises:
      a conversion circuit coupled to the plurality of little cores and configured to:
         shift a base voltage on the plurality of data lines from the little core power rail to the big core power rail.

6. The processor-based system of claim 5, wherein:
   the conversion circuit is further configured to:
      shift a base frequency on the plurality of data lines from the little core clock to the big core clock.

7. The processor-based system of claim 1, wherein:
   the processor-based system configured to determine whether each of the plurality of big cores and the plurality of little cores is active or inactive, is further configured to:
      monitor whether the big core power rail becomes decoupled from one or more of the plurality of big cores.

8. The processor-based system of claim 3, wherein:
   the processor-based system configured to determine whether each of the plurality of big cores and the plurality of little cores is active or inactive, is further configured to:
      monitor whether the big core clock becomes decoupled from one or more of the plurality of big cores.

9. The processor-based system of claim 1 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

10. A method for dynamically coupling power and a clock to a last level cache, comprising:
   coupling a big core power rail to a plurality of big cores, each big core having a first pipeline length;
   coupling a little core power rail to a plurality of little cores, each little core having a second pipeline length less than the first pipeline length;
   coupling the last level cache to the plurality of big cores and the plurality of little cores;
   determining whether each of the plurality of big cores and the plurality of little cores is active or inactive; and
   in response to determining at least one of the plurality of big cores is active:
      coupling the big core power rail to the last level cache.

11. The method of claim 10, further comprising:
   in response to determining the plurality of big cores are inactive and at least one of the plurality of little cores is active:
      coupling the little core power rail to the last level cache.

12. The method of claim 10, further comprising:

coupling a big core clock to the plurality of big cores;

coupling a little core clock to the plurality of little cores; and in response to determining the at least one of the plurality of big cores is active:

coupling the big core clock to the last level cache.

13. The method of claim 12, further comprising:

in response to determining the plurality of big cores are inactive and at least one of the plurality of little cores is active:

coupling the little core clock to the last level cache.

14. The method of claim 12, further comprising:

communicating between the plurality of little cores to the last level cache through a plurality of data lines; and coupling a conversion circuit to the plurality of little cores to shift a base voltage on the plurality of data lines from the little core power rail to the big core power rail.

15. The method of claim 14, further comprising:

shifting a base frequency on the plurality of data lines from the little core clock to the big core clock.

16. The method of claim 10, wherein:

determining whether each of the plurality of big cores and the plurality of little cores is active or inactive further comprises:

monitoring whether the big core power rail becomes decoupled from one or more of the plurality of big cores.

17. The method of claim 12, wherein:

determining whether each of the plurality of big cores and the plurality of little cores is active or inactive further comprises:

monitoring whether the big core clock becomes decoupled from one or more of the plurality of big cores.

18. A processor-based system for dynamically coupling power and a clock to a last level cache, comprising:

means for coupling a big core power rail to a plurality of big cores, each big core having a first pipeline length;

means for coupling a little core power rail to a plurality of little cores, each little core having a second pipeline length less than the first pipeline length;

means for coupling the last level cache to the plurality of big cores and the plurality of little cores;

means for determining whether each of the plurality of big cores and the plurality of little cores is active or inactive; and in response to determining at least one of the plurality of big cores is active:

means for coupling the big core power rail to the last level cache.

19. The processor-based system of claim 18, further comprising:

in response to determining the plurality of big cores are inactive and at least one of the plurality of little cores is active:

means for coupling the little core power rail to the last level cache.

20. The processor-based system of claim 18, further comprising:

means for coupling a big core clock to the plurality of big cores;

means for coupling a little core clock to the plurality of little cores; and in response to determining the at least one of the plurality of big cores is active:

means for coupling the big core clock to the last level cache.

* * * * *